United States Patent
DeLamielleure et al.

(10) Patent No.: US 9,126,856 B2
(45) Date of Patent: Sep. 8, 2015

(54) FUSION PROCESSES FOR PRODUCING SHEET GLASS

(75) Inventors: Megan A. DeLamielleure, Corning, NY (US); Irene M. Peterson, Elmira Heights, NY (US)

(73) Assignee: Corning Incorporated, Corning, NY (US)

(*) Notice: Subject to any disclaimer, the term of this patent is extended or adjusted under 35 U.S.C. 154(b) by 44 days.

(21) Appl. No.: 12/950,499

(22) Filed: Nov. 19, 2010

(65) Prior Publication Data

US 2011/0120191 A1    May 26, 2011

Related U.S. Application Data

(60) Provisional application No. 61/264,521, filed on Nov. 25, 2009.

(51) Int. Cl.
 *C03B 5/26* (2006.01)
 *C03B 5/16* (2006.01)
 *C03B 5/235* (2006.01)

(52) U.S. Cl.
 CPC .. *C03B 5/16* (2013.01); *C03B 5/235* (2013.01)

(58) Field of Classification Search
 CPC ................................ C03B 5/16; C03B 5/235
 USPC ............ 65/29.21, 53, 83, 121, 137, 193, 195, 65/203, 204
 See application file for complete search history.

(56) References Cited

U.S. PATENT DOCUMENTS

| 3,338,696 A | 8/1967 | Dockerty .................. 65/145 |
| 3,682,609 A | 8/1972 | Dockerty .................... 65/83 |
| 6,401,492 B1* | 6/2002 | Nattermann ............... 65/347 |
| 2003/0121287 A1* | 7/2003 | Chalk et al. .................. 65/90 |
| 2007/0149380 A1* | 6/2007 | Dorfeld et al. ............. 501/55 |
| 2008/0011016 A1* | 1/2008 | Bergman et al. ......... 65/29.12 |
| 2009/0217705 A1* | 9/2009 | Filippov et al. ........... 65/99.1 |

FOREIGN PATENT DOCUMENTS

| CN | 101328006 A | 12/2008 |
| JP | 2005-132713 A | 5/2005 |
| JP | 2009-502715 A | 1/2009 |
| JP | 2010-168279 | 8/2010 |
| WO | WO2007/018910 | 2/2007 |

OTHER PUBLICATIONS

Kostov, Zircon morphology as a Crystallogenetic indicator, Kristall und Technik, vol. 8, Issue 1-3, pp. 11-19, 1973.*
Mel'nikova, I. G. et al, Zircon refractories for glass-melting (review), Glass and Ceramics, Springer New York, vol. 42, Issue 7, Jul. 1, 1985, pp. 295-298.*

(Continued)

*Primary Examiner* — Richard Crispino
*Assistant Examiner* — Yana B Krinker
(74) *Attorney, Agent, or Firm* — Ryan T. Hardee

(57) ABSTRACT

Methods are provided for controlling the formation of defects in sheet glass produced by a fusion process which employs a zirconia melting unit. The methods comprise controlling the temperature profile of the glass as it passes through the finer, finer to stir chamber connecting tube, and stir chamber to minimize both the amount of zirconia which diffuses into the glass and the amount of secondary zirconia based defects which comes out of solution in the stir chamber.

19 Claims, 6 Drawing Sheets

(56) References Cited

OTHER PUBLICATIONS

Deep Processing Technology of Sheet Glass, edited by Raipu Zhu, Wuhan Technical College Press, Wuhan, China, 2002, p. 38.

Defects in Glass Manufacture, edited by H. Gibson-Maweide and R. Bruckner, Light Industry Publishing House, Beijing, China, 1988, pp. 8 and 30.

* cited by examiner

1200°C

1250°C

1300°C

1350°C

1400°C

1450°C

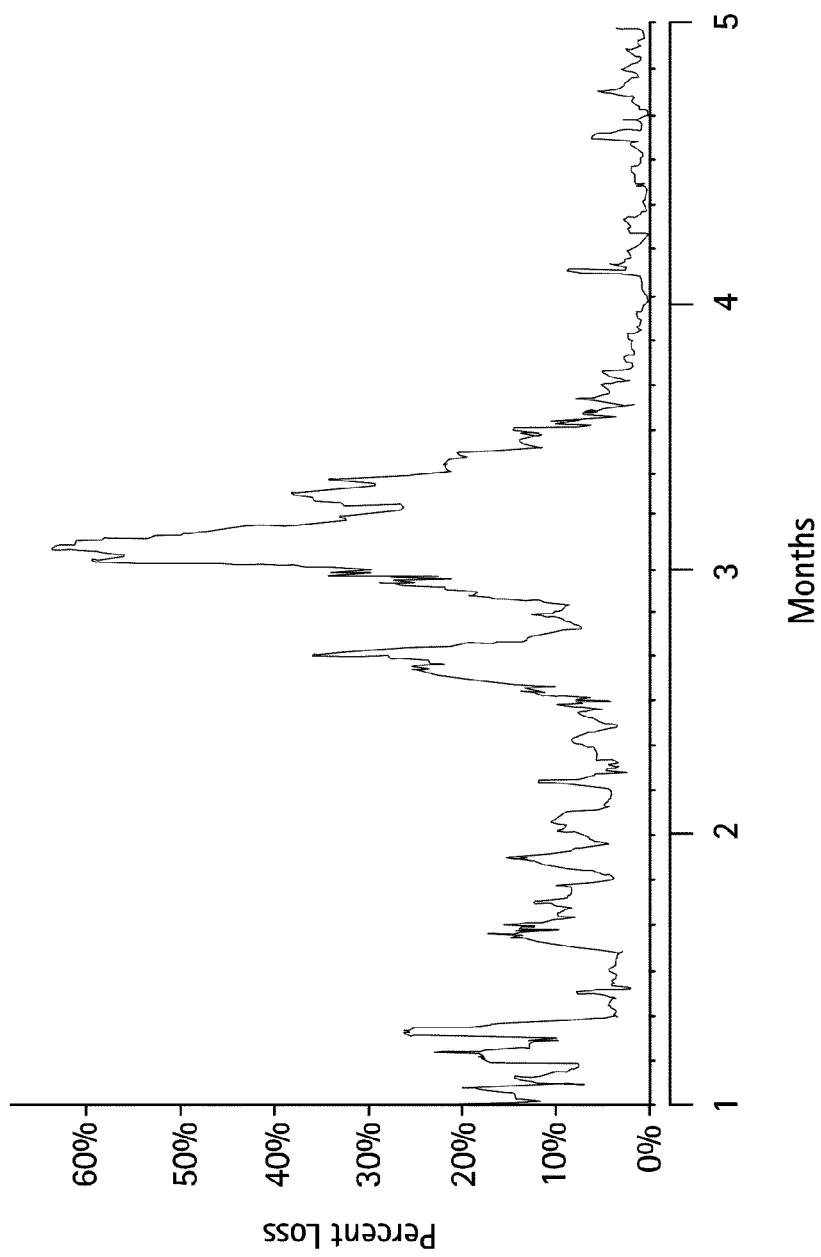

US 9,126,856 B2

FUSION PROCESSES FOR PRODUCING SHEET GLASS

CLAIMING BENEFIT OF PRIOR FILED U.S. APPLICATION

This application claims the benefit of U.S. Application Ser. No. 61/264,521, filed on Nov. 25, 2009. The content of this document and the entire disclosure of publications, patents, and patent documents mentioned herein are incorporated by reference.

FIELD

This disclosure relates to fusion processes for producing sheet glass and, in particular, to fusion processes which employ fused zirconia melting vessels. Even more particularly, the disclosure relates to controlling the formation of zirconia-based defects in sheet glass produced by fusion processes employing fused zirconia melting vessels.

The techniques disclosed herein are particularly useful when fusion processes are employed to produce glass sheets for use as substrates in the manufacture of liquid crystal displays, e.g., AMLCDs.

BACKGROUND

The fusion process is one of the basic techniques used in the glass making art to produce sheet glass. See, for example, Varshneya, Arun K., "Flat Glass," *Fundamentals of Inorganic Glasses*, Academic Press, Inc., Boston, 1994, Chapter 20, Section 4.2., 534-540. Compared to other processes known in the art, e.g., the float and slot draw processes, the fusion process produces glass sheets whose surfaces have superior flatness and smoothness. As a result, the fusion process has become of particular importance in the production of the glass substrates used in the manufacture of liquid crystal displays (LCDs).

The fusion process, specifically, the overflow downdraw fusion process, is the subject of commonly assigned U.S. Pat. Nos. 3,338,696 and 3,682,609, to Stuart M. Dockerty. A schematic drawing of the process of these patents is shown in FIG. 1. As illustrated therein, molten glass is supplied to a trough formed in a refractory body known as an "isopipe."

Once steady state operation has been achieved, molten glass overflows the top of the trough on both sides so as to form two sheets of glass that flow downward and then inward along the outer surfaces of the isopipe. The two sheets meet at the bottom or root of the isopipe, where they fuse together into a single sheet. The single sheet is then fed to drawing equipment (shown as glass pulling rolls in FIG. 1), which controls the thickness of the sheet by the rate at which the sheet is drawn away from the root. The drawing equipment is located well downstream of the root so that the single sheet has cooled and become rigid before coming into contact with the equipment.

The outer surfaces of the final glass sheet do not contact any part of the outside surface of the isopipe during any part of the process. Rather, these surfaces only see the ambient atmosphere. The inner surfaces of the two half sheets which form the final sheet do contact the isopipe, but those inner surfaces fuse together at the root of the isopipe and are thus buried in the body of the final sheet. In this way, the superior properties of the outer surfaces of the final sheet are achieved.

Upstream of the forming equipment is typically found a glass melting vessel, a glass fining vessel, a finer to stir chamber connecting tube, a stir chamber, a stir chamber to bowl connecting tube, and a delivery vessel.

SUMMARY

The present disclosure provides methods for reducing the level of zirconia based defects in sheet glass produced using fusion processes which employ fused zirconia melting vessels. The methods involve diagnosing the type of zircon defect encountered and if necessary, increasing the temperature of the glass manufacturing equipment upstream of the stir chamber (finer to stir chamber connecting tube, fining vessel, and melting vessel).

BRIEF DESCRIPTION OF THE DRAWINGS

FIG. 4 is a graph illustrating the reduction in secondary zircon defects after temperature increases in accordance with the present disclosure were implemented.

DETAILED DESCRIPTION

Figure 1:
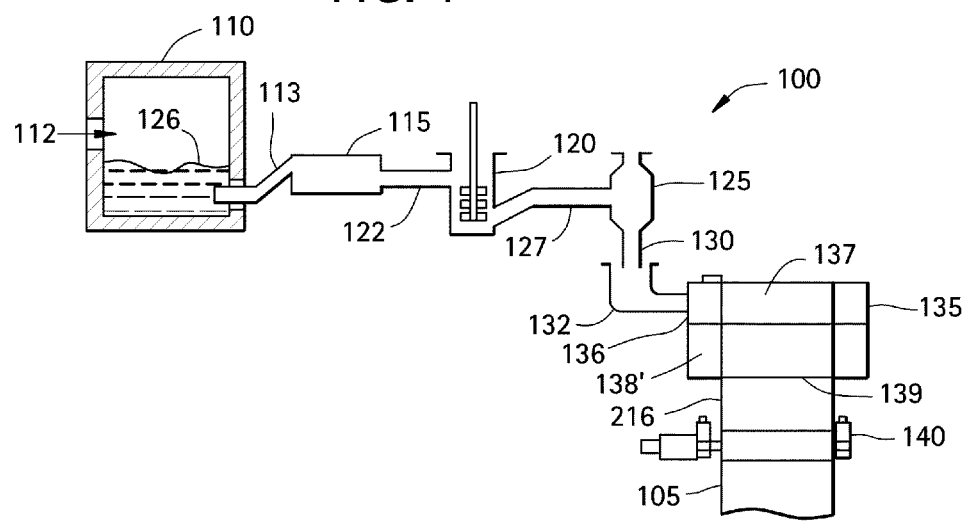
FIG. 1 is a schematic drawing illustrating a representative overflow downdraw fusion process for making flat glass sheets.
Figure 2:
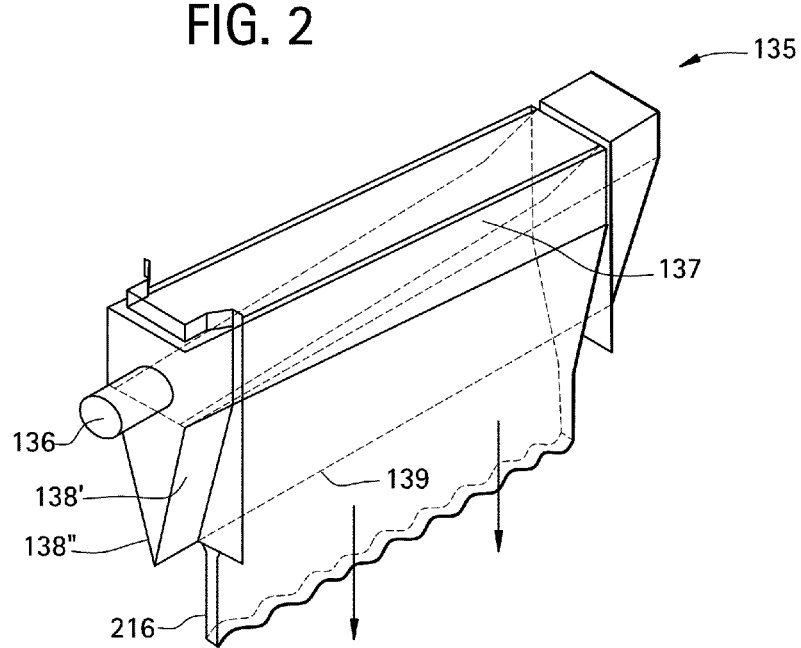
FIG. 2 is a perspective view of an exemplary forming apparatus that can be used in the glass manufacturing system of FIG. 1.
Figure 3A:
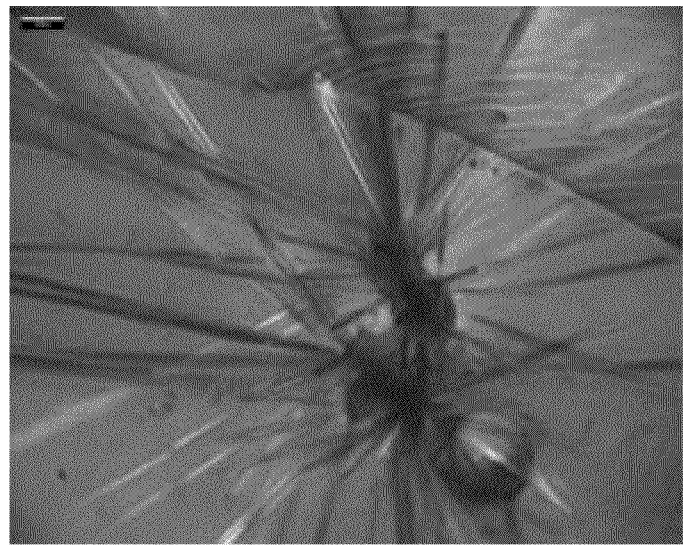
FIGS. 3 A-F are optical micrographs of secondary zircon defects in glasses melted at various different temperatures.
Figure 3B:
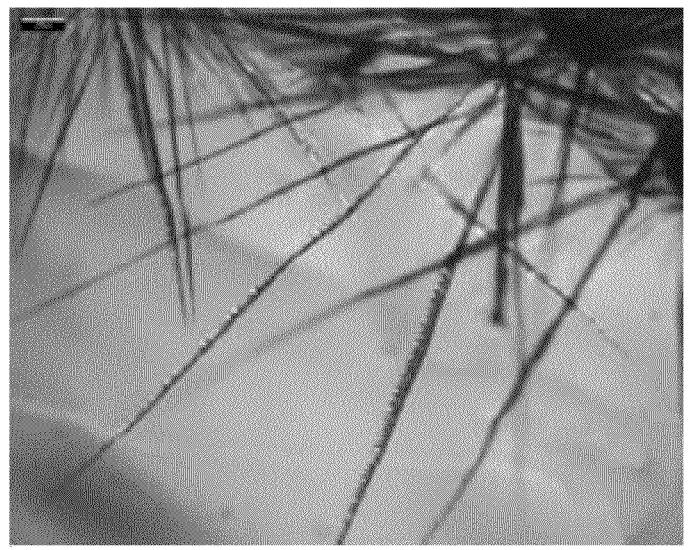
Figure 3C:
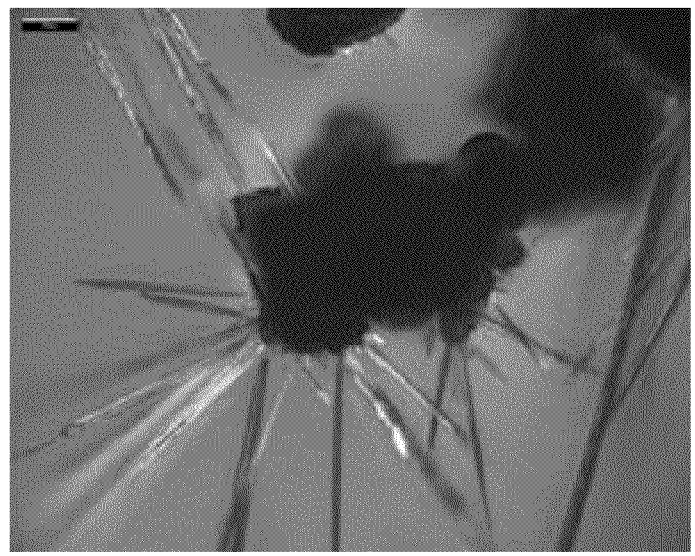
Figure 3D:
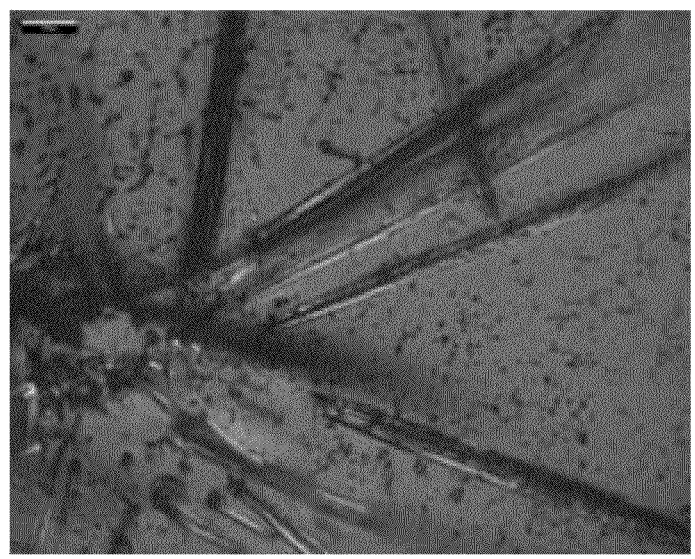
Figure 3E:
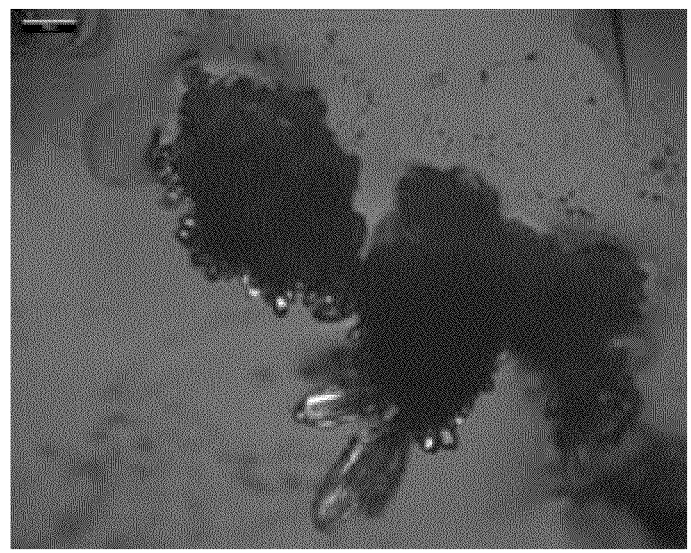
Figure 3F:

Referring to FIG. 1, there is a diagram of an exemplary glass manufacturing system 100 that can use the fusion process to make a glass substrate 105. As shown in FIG. 1, the glass manufacturing system 100 includes a melting vessel 110, a fining vessel 115, a mixing vessel 120 (e.g., stir chamber 120), a delivery vessel 125 (e.g., bowl 125), a forming apparatus 135 (e.g., isopipe 135) and a pull roll assembly 140 (e.g., draw machine 140). The melting vessel 110 is where the glass batch materials are introduced as shown by arrow 112 and melted to form molten glass 126. The temperature of the melting vessel (Tm) will vary based on the specific glass composition, but may range from between 1500° and 1650° C. For display glasses for use in LCDs, melting temperatures may exceed 1500° C., 1550° C. and for some glasses, may even exceed 1650° C. A cooling refractory tube 113 may optionally be present connecting the melting vessel with the fining vessel 115. This cooling refractory tube 113 may have a temperature (Tc) that is between 0°-15° C. cooler than the temperature of the melting vessel 110. The fining vessel 115 (e.g., finer tube 115) has a high temperature processing area that receives the molten glass 126 (not shown) from the melting vessel 110 and in which bubbles are removed from the molten glass 126. The temperature of the fining vessel (Tf) is generally equal to or higher than that of the melting vessel (Tm) in order to lower viscosity and encourage gas removal from the molten glass. In some embodiments, the fining vessel temperature is between 1600° and 1720° C., and in some embodiments exceeds the temperature of the melting vessel by 20° to 70° C., or more. The fining vessel 115 is connected to the mixing vessel 120 (e.g., stir chamber 120) by a finer to stir chamber connecting tube 122. Within this connecting tube 122, the glass temperature is continually and steadily decreased from the fining vessel temperature (Tf) to the stir chamber temperature (Ts), which typically represents a temperature decrease of between 150° and 300° C. The mixing vessel 120 is connected to the delivery vessel 125 by a stir chamber to bowl connecting tube 127. The mixing vessel 120 is responsible for homogenizing the glass melt and removing concentration differences within the glass that can cause cord defects. The delivery vessel 125 delivers the molten glass 126 through a downcomer 130 to an inlet 132 and into the forming apparatus 135 (e.g., isopipe 135). The forming apparatus 135 includes an inlet 136 that receives the molten glass which flows into a trough 137 and then overflows and runs down two sides 138' and 138" before fusing together at what is known as a root 139 (see FIG. 2). The root 139 is where the two sides 138' and 138" come together and where the two overflow walls of molten glass 216 rejoin (e.g., refuse) before being drawn downward between two rolls in the pull roll assembly 140 to form the glass substrate 105.

The melting vessels used in the manufacture of glass substrates by the fusion process are subjected to extremely high temperature and substantial mechanical loads. So as to be able to withstand these demanding conditions, the refractory blocks making up the melting vessel are typically made from cast fused zirconia. The fused zirconia blocks are highly resistant to wear and are generally associated with low inclusion rates in the finished glass substrate product. In particular, the blocks are created by placing $ZrO_2$ powder into graphite crucibles or molds which are then placed into an arc furnace. The arc furnace utilizes electric potential to produce temperatures in excess of 2000° C. in order to melt and fuse into cast shapes, the zirconia material.

It has been known that a major source of losses in the manufacture of sheet glass for use as LCD substrates is the presence of zircon crystals (referred to herein as "secondary zircon crystals" or "secondary zircon defects") in the glass as a result of the glass' passage into and over the zircon isopipe used in the manufacturing process.

Co-assigned US Patent Application 2003/0121287 describes in detail several means for addressing this form of secondary zircon crystal defect; namely to operate the fusion process under conditions that cause;

(a) less zirconia to go into solution in the trough and the upper portions of the isopipe, and/or
(b) less zirconia to come out of solution and combine with silica to form secondary zircon crystals at the bottom of the isopipe (this coming out of solution may be considered as involving devitrification and/or precipitation of the zircon crystals).

Operating parameters that addressed these conditions included: (a) lowering the operating temperature (specifically, the glass temperature) at the top of the isopipe (trough and weir regions), or (b) raising the operating temperature (specifically, the glass temperature) at the bottom of the isopipe (root region), or (c) lowering the operating temperature at the top and raising the operating temperature at the bottom of the isopipe.

In accordance with the present disclosure, it has been further discovered that another type of secondary zircon crystallization occurs due to mechanisms well upstream of the forming equipment (e.g. isopipe). These defects are believed to be associated with zirconia dissolving into molten glass after having entered as a result of wear upon the fused zirconia refractory walls of the melting vessel 110. It is believed that these defects present themselves as secondary zircon in the area of the finer to stir chamber connecting tube 122, and at extremely high concentrations as secondary zirconia. The defects associated with the finer to stir chamber connecting tube ultimately arise as a result of zirconia (i.e., $ZrO_2$ and/or $Zr^{+4}+2O^{-2}$) dissolving into the molten glass at the temperatures and viscosities that exist in the melting vessel itself. The exposure of the zirconia refractory blocks of the melting unit to the molten glass results in slow but appreciable and continuous erosion of the blocks. This degradation or refractory wear results in a detectable amount of zirconia entering the molten glass material. In the melting vessel, when zirconia is slowly eroded from the melting vessel walls, pockets of relatively high concentration of zirconia called "zirconia sludge" or "zirconia stones" are created. Occasionally, these zirconia stones or the zirconia sludge will move downstream in the process from the melting vessel, to the fining vessel, and to the finer to stir chamber connecting tube, where the temperature is considerably lower than in the melting vessel or the fining vessel. Also, the glass viscosity increases as the glass travels from the finer to the stir chamber due to the cooling taking place.

The solubility and diffusivity of zirconia in molten glass is a function of the glass' temperature and viscosity (i.e., as the temperature of the glass decreases and the viscosity increases, less zirconia can be held in solution and the rate of diffusion decreases.) As the glass nears the stir chamber and the temperature decreases, the zirconia sludge regions become supersaturated with zirconia. As a result, it is believed that zircon crystals—$ZrSiO_4$ (i.e., secondary zircon crystals) nucleate and grow in the finer to stir chamber connecting tube, which is typically made from platinum or a platinum alloy. Most likely nucleation occurs at the glass-platinum interface where flow may be somewhat reduced and the relative weight of the zirconia is likely to create higher concentrations. The platinum itself likely serves are the nucleating agent for many of the defects. At particularly high concentrations of zirconia, it is possible to also observe crystalline zirconia—$ZrO_2$ (i.e. secondary zirconia crystals). Collectively, the secondary zircon defects and the secondary zirconia defects may be referred to as secondary zirconia based defects.

Eventually these crystals flow into the stir chamber, are mixed throughout the glass melt, and present themselves as defects in the glass sheet. Typically, the building up of zirconia-rich sludge does not become a problem until the melting vessel walls have eroded a substantial amount.

This can take a substantial period of time, e.g., three or more months of continuous operation.

Although the disclosure has focused on fused zirconia refractory melting vessels, it is possible that the same issue may present itself in the case of melting vessels made from any high zirconia content refractory materials. The higher the level of zirconia contained within the refractory, the larger the secondary zirconia based defect issue may be resulting from refractory wear. It has been also theorized that secondary zirconia based defects may present themselves in regions of the melting vessel itself that are not as efficiently heated. The cooler the temperatures in certain regions of the melting vessel (e.g. below the zircon devitrification temperature), the more likely it is for the melting vessel itself to be a location for the secondary zirconia based defect formation. However, many secondary zirconia based defects that occur in the melting vessel will dissolve at the relatively higher temperatures of the fining vessel.

In one embodiment, the present disclosure describes a mechanism for reducing secondary zirconia based crystal formation caused by degradation of the zirconia refractory making up the melting vessel. In such instances, by raising the temperature of certain components of the glass delivery system upstream of the stir chamber, the secondary zirconia based defect problem in the finer to stir chamber connecting tube can be reduced. In one embodiment, the temperature of the finer to stir chamber connecting tube is increased. In another embodiment, portions of the melting, fining and delivery system upstream of the stir chamber are increased. In yet another embodiment, the temperature of the finer to stir chamber connecting tube is raised to a temperature in excess of the zircon devitrification temperature. The zircon devitrification temperature varies depending on the specific glass composition, but for typical glasses used as LCD substrates, the zircon divitrification temperature is between approximately 1150° to 1550° C., depending on the concentration of zirconia dissolved in the glass. In another embodiment, the temperature of portions of the melting, fining and delivery system upstream of the stir chamber are continually maintained at temperatures in excess of the zirconia devitrification temperature.

Figure 5:
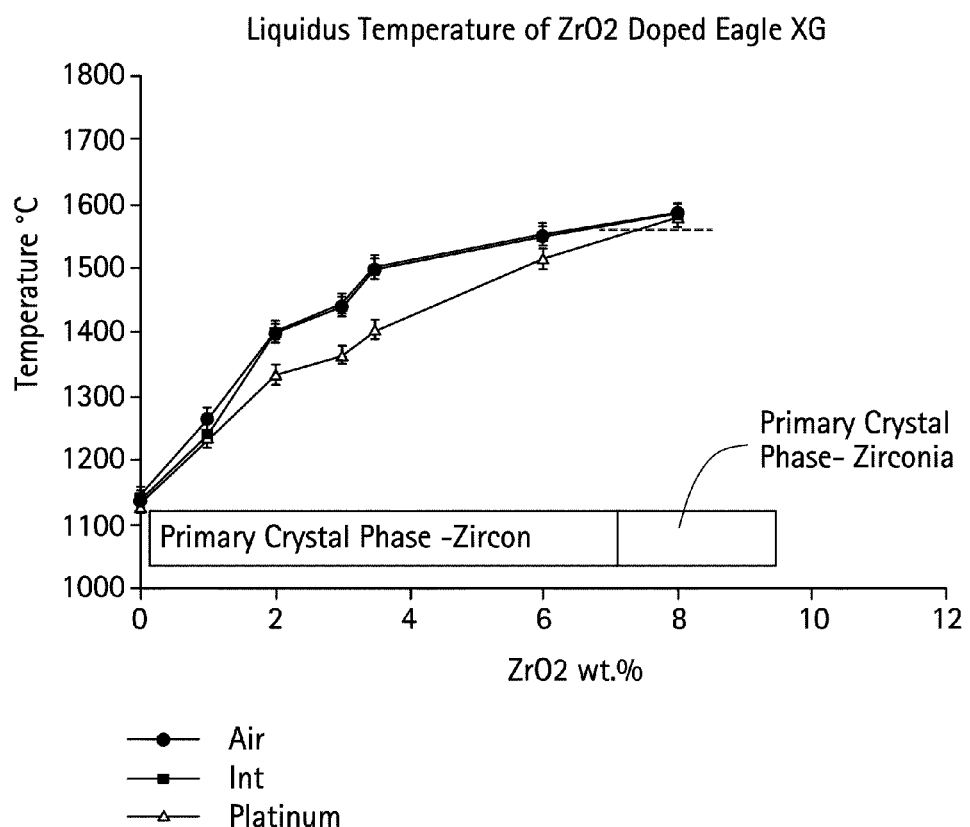
FIG. 5 is a graph illustrating the zircon devitrification temperatures for an exemplary glass concentration over a range of zirconia concentrations.

Interestingly, the inventors have observed that because of the temperature at which certain types of crystals tend to form, one can diagnose the origins of the specific secondary zirconia based defect. For example, it was determined that at temperatures below 1400° C., the zircon crystal defects are generally dendritic in shape and morphology. At 1400° C. and above, the crystal pattern tends to be prismatic. FIG. 3 shows optical micrographs of various samples of Eagle XG™ (sold by Corning Incorporated®—see U.S. Patent Application 2006/0293162) glass melted in a gradient boat within an experimental platinum crucible. The representative glass contained no dissolved zirconia at the beginning of the experiment, but was mixed with 10 volume % crushed solid zirconia refractory. The mixture of glass and refractory was placed in a platinum boat in a thermal gradient from approximately 1100° C. to 1600° C. During the experiment, zirconia from the refractory dissolved into the melt, combined with silica, and crystallized in the form of zircon. As can be observed from the micrographs in FIGS. 3A-3F, the type of crystals that are formed in the resultant glass distinguish their origin. The micrographs display crystal formation in 50° C. increments from 1200° C.-1450° C. Crystals formed at or around the isopipe where the temperature is typically well below 1350° C. can be readily distinguished from those occurring in the upstream process where temperatures are generally well above 1400° C. (e.g. melting vessel, fining vessel, or finer to stirring vessel connecting tube). These identifying crystal characteristics have been found to be repeatable regardless of zirconia concentration in the glass. FIG. 5 shows the devitrification temperature for zircon in Eagle XG™ glass with varying concentration of zirconia in the glass. As can be seen, the devitrification temperature for glass at a platinum interface is lower than that in the glass interior or at an air interface. Since the manufacture of most LCD glasses utilize platinum based refractory for the fining vessel and the finer to stir chamber connecting tube, those systems should have the temperature maintained at least above the zircon devitrification temperature indicated for the platinum interfaces. The highest temperature at which zircon crystals form increases with increasing dissolved zirconia concentration in the glass, and the size of the crystals at a given temperature increases with the amount of zirconia dissolved in the glass. However, the morphology of the zircon crystals is not affected by the amount of dissolved zirconia in the glass—only by the thermal conditions present during crystallization. If the amount of dissolved zirconia in the glass reaches about 7 wt % or more, zirconia also starts to crystallize. Above 8 wt %, only zirconia crystals form, not zircon crystals. Since the temperatures of the various components of the fusion manufacturing process vary, this observation is extremely useful in diagnosing exactly where within the process any given defect is likely to have originated. Once identified, the temperature of the affected area may be changed in an amount sufficient to eliminate the defects. In one embodiment, when a prismatic crystal defect is detected, the temperature is adjusted in all components of the manufacturing system upstream of the stir chamber to a temperature that exceeds the zircon devitrification temperature of the glass.

Increasing the temperature at any point in the process prior to the stir chamber 120 will have the beneficial effect of increased zirconia solubility and will also create a lower viscosity glass capable of effectively dissolving zirconia sludge or zirconia stones that may have entered the flow from the glass melting vessel. In practice, an empirical approach is used with the temperatures being adjusted until the levels of secondary zirconia based defects in the finished glass are at a commercially acceptable level, e.g., at a level less than 0.1 defects per pound of finished glass. In another embodiment, the temperature is adjusted to reduce the defect level of the glass to less than 0.01 defects per pound. In yet another embodiment, the defect level of the glass is reduced to less than 0.0067 defects per pound. In yet another embodiment, the defect level is reduced to less than 0.001 defects per pound. In general terms and in some embodiments, the temperature of the finer to stir chamber connecting tube and other portions of the assembly upstream of the stir chamber should be raised to a level that meets or exceeds the zircon devitrification temperature of the glass.

Although this disclosure has been directed to the secondary zirconia based defect effect that occurs in a fusion glass manufacturing system, it should be understood that it may be likewise applied to other glass manufacturing approaches/processes that employ a zirconia based melting vessel as part of the process equipment.

Specific Embodiments of the Invention

FIG. 4 is a graph showing representative changes in operating temperatures designed to achieve a reduction in the level of secondary zircon defects in the resultant substrate glass from approximately 0.0067 defects per pound to approximately 0.0005 defects per pound, i.e., a 92% reduction in the number of defects. In this example, a representative commercially available alkali, arsenic, barium and antimony free glass composition (Eagle XG™ sold by Corning Incorporated®—see U.S. Patent Application 2006/0293162) was batched and formed on an experimental commercial fusion system. The minimum temperature of the finer to stir chamber connecting tube was increased from approximately 1430° C. to approximately 1490° C. As can be observed from the graph (FIG. 4), once the temperature increase had time to take effect, a dramatic reduction in secondary zircon inclusions was noted.

Although the experimental activity described above was performed with a particular glass composition, suitable operating temperatures (glass temperatures) for other glasses can be readily determined from the present disclosure. The specific temperatures used will depend on such variables as glass composition, glass flow rate and precise location(s) of the enhanced heating. Thus, in practice, an empirical approach is used with the temperatures being adjusted until the levels of secondary zircon defects in the finished glass are at a commercially acceptable level, e.g., at a level of less than 0.0067 defects per pound of finished glass. For complete elimination of the defect associated with the zirconia melting vessel, it is believed that the temperature of all areas upstream of the stir chamber would need to be increased to above the zircon devitrification temperature which is approximately 1580° C. at 6 wt % zirconia content, for example in Eagle XG™

What is claimed is:

1. A method of producing glass sheets, said method being a fusion process characterized by the steps of:
   (a) melting batch materials in a glass melting vessel comprised of zirconia refractory to form molten glass;
   (b) fining the molten glass in a fining vessel made of a platinum based refractory to remove gasses;
   (c) transporting the molten glass to a stir chamber through a finer to stir chamber connecting tube made of a platinum based refractory;
   (d) stirring the molten glass in the stir chamber;
   (e) delivering the molten glass to a forming apparatus;
   (f) forming the glass into a ribbon; and
   (g) cutting glass sheets from the formed ribbon;
   wherein:
   (i) the method comprises determining a zircon devitrification temperature at a platinum interface of the molten glass formed in step (a) and maintaining a temperature of each of the glass melting vessel, fining vessel, and finer to stir chamber connecting tube in excess of said zircon devitrification temperature; and
   (ii) the glass sheets of step (g) have a secondary zirconia based defect level of less than 0.1 defects per pound.

2. The method of claim 1 wherein the temperature of the finer to stir chamber connecting tube is raised to greater than 1450° C.

3. A method of manufacturing glass sheets by a fusion process comprising the steps of:
   (a) providing a fusion forming glass sheet manufacturing system which includes a stir chamber;
   (b) measuring a secondary zirconia based defect level in glass sheets formed by the system; and
   (c) examining secondary zirconia based defects in glass sheets formed by the system
   detecting secondary zirconia based defects having a prismatic crystal morphology and based on that detection elevating the temperature of a portion or portions of the manufacturing system upstream of the stir chamber in an amount sufficient to decrease the secondary zirconia based defect level in glass sheets produced by the system to less than 0.1 per pound, wherein the elevating of the temperature of a portion or portions of the manufacturing system upstream of the stir chamber comprises elevating the temperature of a vessel made of a platinum based refractory.

4. The method of claim 3 wherein the temperature is elevated to an amount equal to or in excess of the zircon devitrification temperature of the glass of the glass sheets.

5. The method of claim 3 wherein the portion or portions of the manufacturing system comprise a finer to stir chamber connecting tube.

6. The method of claim 3 wherein the temperature is 1450° C. or above.

7. The method of claim 3 wherein the secondary zirconia based defect is secondary zircon.

8. The method of claim 3 wherein the secondary zirconia based defect is a combination of secondary zircon and secondary zirconia.

9. The method of claim 3 wherein the secondary zirconia based defect is secondary zirconia.

10. In a method for producing glass sheets by a fusion process in which molten glass is supplied from a zirconia melting vessel to a fining vessel at a predetermined temperature to a finer to stir chamber connecting tube at a predetermined temperature and from a stir chamber to a forming apparatus, the improvement comprising controlling the formation of secondary zirconia based defects so that the level of such defects in the glass sheets is less than 0.1 defects per pound by adjusting the temperature of the finer to stir chamber connecting tube so that substantial amounts of zirconia do not come out of solution and form secondary zirconia based defects before the glass enters the stir chamber, wherein the finer to stir chamber connecting tube is made of a platinum based refractory.

11. The method of claim 10 wherein the glass temperature at the fining vessel is greater than approximately 1630° C.

12. The method of claim 10 wherein the glass temperature in the finer to stir chamber connecting tube is greater than approximately 1460° C.

13. The method of claim 10 wherein the glass temperature in the finer to stir chamber connecting tube at all points is greater than approximately 1490° C.

14. The method of claim 10 wherein the glass temperature in the finer to stir chamber connecting tube at all points is greater than approximately 1520° C.

15. The method of claim 10 wherein the glass temperature in the finer to stir chamber connecting tube at all points is greater than approximately 1550° C.

16. The method of claim 10 wherein the glass temperature at the fining vessel is greater than 1460° C. and the glass temperature at the finer to stir chamber connecting tube at all points is greater than approximately 1460° C.

17. The method of claim 10 wherein $T_f$ is the temperature of the fining vessel, $T_m$ is the temperature of the melting vessel, $T_c$ is the temperature of the finer to stir chamber connecting tube and wherein $T_f > T_m > T_c$ and $T_f$, $T_m$, and $T_c$ all exceed the devitrification temperature of zircon in the glass.

18. The method of claim 10 wherein the level of secondary zirconia based defects in the finished glass sheets is less than or equal to 0.0067 defects per pound.

19. The method of claim 10 further comprising using the glass sheets as substrates for the production of liquid crystal displays.

* * * * *